United States Patent Office 3,086,039
Patented Apr. 16, 1963

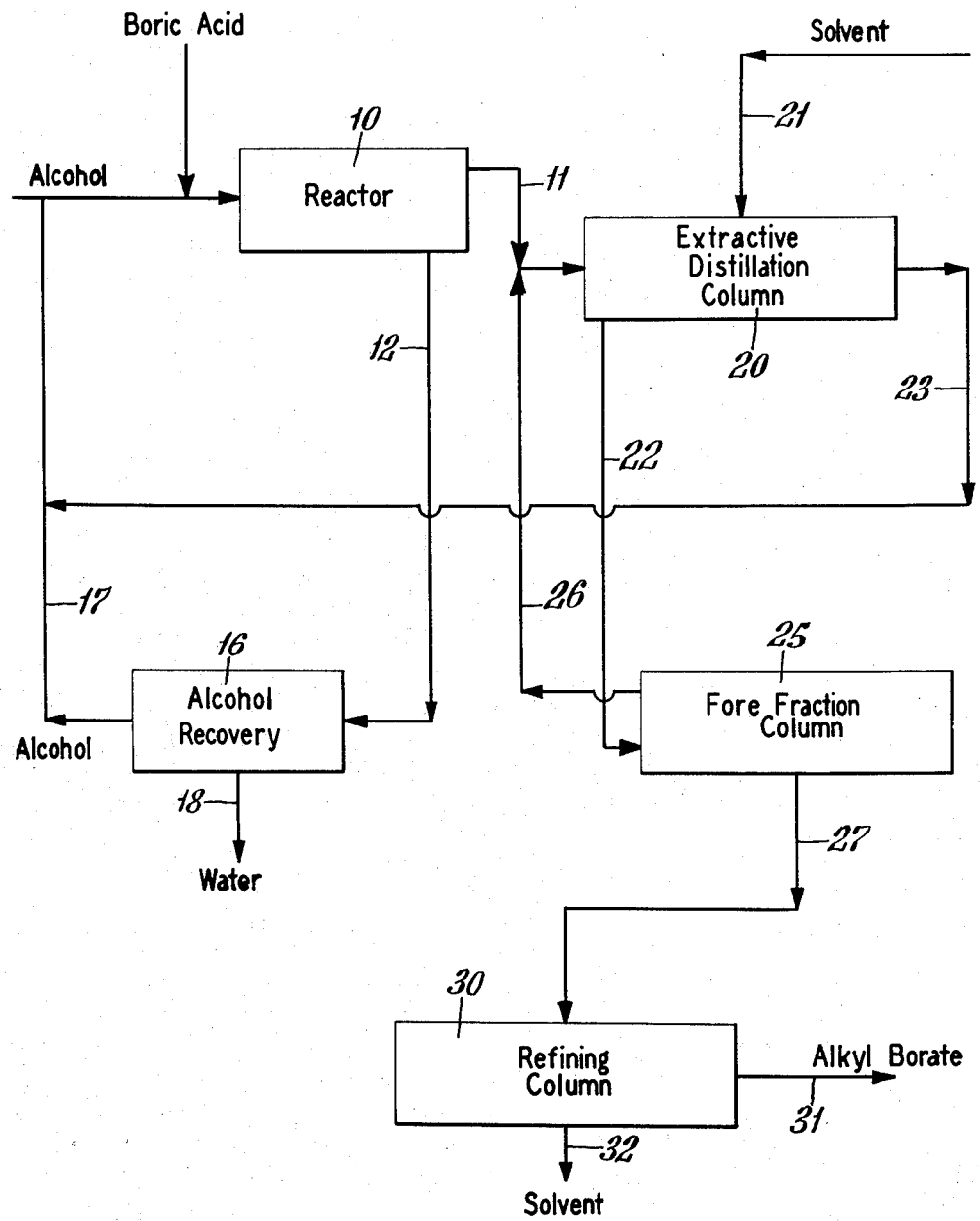

3,086,039
PREPARATION OF ALKYL BORATE ESTERS
Clare A. Carter, South Charleston, W. Va., assignor to Union Carbide Corporation, a corporation of New York
Filed Sept. 9, 1958, Ser. No. 760,023
5 Claims. (Cl. 260—462)

This invention relates to alkyl borates and more particularly to a method for the separation of alkyl borates from mixtures thereof with lower aliphatic alcohols.

In recent years the chemistry of boron has become more important and significant in the chemical industry due to the rapid growth of boron derivatives which find utility as gasoline additives and high energy fuels. As an intermediate in the preparation of fuels and fuel additives, alkyl borates, such as trimethyl borate, for example, can be derived from relatively inexpensive raw materials which advantageously provide a comparatively high boron content.

The known procedures for preparing alkyl borates such as propyl and isopropyl borates, tributyl borate, amyl borate and hexyl borate, whether by direct synthesis of the acid or by ester exchange, generally involve the formation of mixtures of the borate with the alcohol precursor corresponding to the alkyl borate desired. Such alkyl borate-alcohol mixtures can be readily separated by conventional techniques. In the preparation of alkyl borates from lower aliphatic alcohols such as methanol and ethanol, however, the alkyl borates thus prepared tend to form mixtures or binary azeotropes which are resolved with difficulty and by procedures which complicate recovery of the ester. Known methods for separating such mixtures or azeotropes are cumbersome and expensive.

The present invention is predicated on the discovery that either mixtures or binary azeotropes of alkyl borates and lower aliphatic alcohols can be successfully separated by subjecting the mixture to extractive distillation. It has been found that when alkyl borate-alcohol mixtures, such as trimethyl borate-methyl alcohol azeotrope or triethyl borate-ethanol azeotrope, are vaporized in a distillation column and the ascending vapors are brought into contact with a water-immiscible solvent which flows downward and countercurrent to the ascending vapors, the solvent effectively separates substantially all of the alkyl borate from the alcohol while descending downward through the column. The alkyl borate and solvent are thus recovered substantially free of the lower aliphatic alcohol and the alkyl borate can be subsequently recovered from the solvent in a conventional manner.

The method of the invention can be accomplished in a continuous or batchwise fashion, and for most economical and efficient operation, it is preferable to prepare the alkyl borate-alcohol mixture in a first stage and thereafter continuously subject the mixture to extractive distillation to resolve the mixture. The alkyl borate and solvent can be separately recovered, preferably by distillation, and the solvent recycled to the extraction column. The particular preparation of the alkyl borate-alcohol mixture and manner for effecting separation of the solvent-alkyl borate mixture as obtained by extractive distillation are not critical of the primary aspect of the invention.

As used herein throughout the specification and claims, the expression "alkyl borate," "borate" or "borate ester" refers to boric acid triesters. The term "lower aliphatic alcohol" refers to low boiling monohydric alcohols selected from the group of methanol, ethanol, and mixtures thereof. The term "resolve" is used interchangeably with the term "separate."

The water immiscible solvent utilized in accordance with the invention is selected according to the physical characteristics of the alkyl borate ester that is to be separated from the lower aliphatic alcohol. Generally, the preferred solvent is a water-immiscible hydrocarbon which has a boiling point sufficiently different from that of the alkyl borate so as to facilitate subsequent separation of the borate ester from the solvent by distillation. Hydrocarbon solvents having boiling points higher than the boiling point of the borate ester are most preferred since they permit the ester to be distilled off and the hydrocarbon solvent to be recycled to the extraction column without distillation. A further advantage of using a solvent having a boiling point higher than the borate ester is that it serves as a diluent during distillation of the ester and thereby minimizes prolonged heating and thermal degradation of the alkyl borate during the refining step.

The hydrocarbon solvent should be completely miscible with the borate ester to be separated, essentially immiscible in water and have a low affinity for the alcohol from which the borate ester is to be separated. The hydrocarbon solvent need not be pure. A mixture of hydrocarbons that has the required miscibility with the ester, and is immiscible with water with a low affinity for the alcohol can be used wtih advantage in the method of the invention. The preferred water-immiscible hydrocarbon solvents are the saturated aliphatic hydrocarbons that are liquid at ambient temperatures of about 24° C., and, as indicated, preferably have somewht higher boiling points than the borate ester to be separated. Aromatic hydrocarbons meeting the stated requirements are operable but somewhat less efficient than aliphatic hydrocarbons. Similarly, olefinically unsaturated aliphatic hydrocarbons are operable but are somewhat less desirable. Operable water-immiscible hydrocarbon solvents include straight-chain, branched chain, and cyclic hydrocarbons ranging from such low boiling hydrocarbons such as butane, isobutane, and the low boiling isomeric pentanes to those having melting points close to the ambient temperature, e.g., hexadecane having a melting point at 18° C. Effective use of lower boiling hydrocarbons involves conducting the extractive distillation under superatmospheric pressure. Typical solvents which are preferably employed include xylene, mixtures of isomeric nonanes, undecane, ethylbenzene, and "commercial nonane," a mixture of saturated aliphatic $C_7$, $C_8$, $C_9$, and $C_{10}$ hydrocarbons which contains at least 80% by weight of $C_9$ isomers. Other water immiscible solvents which can be employed are esters such as the dimethyl ester of phthalic acid, dibutyl ether, diisobutyl ketone, and the like.

The relative proportions of solvent in relation to the proportions of borate ester and alcohol that are involved vary widely, as will be appreciated, and are not critical to operability. Optimum proportions and concentrations can be readily determined by trial and error and such determinations are within the skill of chemists. As guides in determining optimum values, the amount of solvent employed should increase as the ratio of alcohol to borate ester in the mixture to be resolved increases. Generally, the amount of solvent used can vary from about 2.0 to 50 times by volume the total volume of ester and alcohol mixture introduced into the extractive distillation column. The preferred amount of solvent ranges from about 8 to 12 times by volume the total volume of the ester alcohol mixture introduced to the extractive distillation column.

It is to be understood, of course, that the amounts of solvent employed are also dependent in part on the efficiency of the equipment used in the extraction, more efficient equipment requiring less solvent. The efficiency of an extraction column used in a continuous process can be increased by any convenient means such as the use of various types of packing, wire screens, perforated plates, rotating stirrer blades, or any combination thereof, within the extraction column.

As above indicated, the mixture of alkyl borate and alcohol is vaporized and the ascending vapors are contacted with the water-immiscible solvent which flows downward through the distillation column and depresses the volatility of the alkyl borate. The temperature employed thus varies with the particular mixture distilled and, in general, can range from about 25° C. to 180° C. under reduced, atmospheric, or superatmospheric pressure. The preferred temperature ranges from about 50 to 150° C. under atmospheric pressure.

The mixture of alkyl borate and alcohol to be separated can advantageously be introduced to the side of the extractive distillation column although the optimum point of introduction of the mixture will vary for different concentrations of alkyl borate and alcohol, the most effective point of introduction usually being somewhere in the lower center half of the column as best determined experimentally in each instance. The solvent is introduced at or near the top of the column and flows downward and countercurrent to the rising vapors thereby depressing the volatility of the ester and sweeping it downward to the bottom of the column. Alcohol vapors and a minor amount of borate ester pass overhead. The solvent and alkyl borate are removed as a liquid from the bottom of the column substantially free of the lower aliphatic alcohol and can be separately recovered, preferably by distillation, in a conventional manner.

In carrying out the method of the invention, the alkyl borate-alcohol mixture is obtained by any conventional esterification procedure. Known methods of preparation have been described in the literature by the method of Schiff, Ann (Supp) 5, 154 (1867) and Schlesinger, JACS, 75, 213 (1953). For the purposes of the invention the alkyl borate-alcohol mixture can be obtained by reacting under liquid phase conditions boric acid or boron oxide with the desired lower aliphatic alcohol at temperatures ranging from 25° C. to 180° C., preferably about 50° C. to 100° C. The reaction can be effected with or without a significant amount of catalyst to help reduce the time required for equilibrium. Suitable catalysts which can be employed in amounts ranging from 0.01 to 1.0% by weight, based on the reaction mixture, are sulfuric acid, hydrochloric acid, and boron trifluoride. The esterification reaction can be effected at reduced, atmospheric, or superatmospheric pressure in any efficient esterification equipment.

The amount of lower aliphatic alcohol employed for obtaining the alkyl borate-alcohol mixture can range from about 3 to 20 moles of the alcohol for each mole of boric acid or boron oxide. The mixture can comprise from about 50 to 95% by weight of borate ester and from about 50 to 5% by weight of alcohol. In the specific embodiment hereinafter described, methanol was reacted with boric acid, in ratio of 6.75 moles of methanol for each mole of acid, to obtain a composition which substantially approximated the constant boiling trimethyl borate-methanol azeotrope (B.P. 54° C. at atmospheric pressure; 27% by weight methanol—73% by weight trimethyl borate).

The accompanying flow sheet illustrates one of the preferred procedures adapted for carrying out the method of the invention as applied to the continuous separation of alkyl borates from mixtures thereof with lower aliphatic alcohols.

As shown in the drawing, esterification reactor 10 is charged initially with alcohol, boric acid and recycled alcohol from alcohol recovery unit 16. The alcohol and boric acid reactants are thoroughly mixed prior to being sent to reactor 10 by any suitable means (not shown). The esterification reactor 10 represents any suitable type of apparatus, such as a still-pot surmounted with a fractionating column, which can be used to effect esterification. An essentially anhydrous overhead distillate of alkyl borate and alcohol is continuously removed through line 11. The water of reaction, unreacted boric acid and excess alcohol are removed from the bottom of the reactor via line 12 and are sent to alcohol recovery unit 16, a fractionating column operating under partial reflux where alcohol is recovered for recycling through line 17 to reactor 10. Small amounts of boric acid and alcohol are removed with water through line 18.

The distillate from reactor 10 is continuously fed through line 11 into extractive distillation column 20 and a water-immiscible solvent enters at or near the top of the column through line 21. Heat is applied to column 20 by either internal means such as steam coils or by external means such as a reboiler.

Alkyl borate-alcohol vapors rise in the column and are brought into contact with the solvent which flows downward and countercurrent to the rising vapors. The solvent depresses the volatility of the alkyl borate and the solvent-alkyl borate components thus descend downward through the column. The overhead vapors comprising alcohol and a small amount of borate ester are recycled to esterification reactor 10 through line 23.

The bottoms material from column 20, containing solvent, alkyl borate and a small amount of alcohol, is taken off via line 22 and sent to forefraction column 25 wherein the alcohol is separated and recycled to column 20 through line 26. The solvent and ester, which are removed from column 25 through line 27, are sent to refining column 30 for separation into refined alkyl-borate, taken off through line 31, and separated solvent, removed through line 32, which can be recycled to the extractive distillation column 20.

The advantages and utility of the invention will become further apparent from the detailed description of the following example which illustrates the best mode now contemplated for practicing the invention.

EXAMPLE 1

*Separation of Trimethyl Borate From Methanol*

A mixture consisting of about 29% by weight methanol and 71% by weight trimethyl borate was continuously removed from an esterification vessel and fed to an extractive distillation column at a rate of 1480 grams per hour. The column was 2 inches in diameter and 100 inches long. The mixture was introduced as a vapor to the side of the column at a point about one sixth the height of the column from the bottom thereof. The temperature maintained ranged from 60° C. at the head to 150° C. at the bottom of the column. "Commercial nonane" was fed to the top of the column at a rate of 13,600 grams per hour while operating the column under a reflux ratio of 1 to 1. The overhead vapors from the extractive distillation column, consisting of about 10.4% by weight trimethyl borate and 89.6% by weight of methanol, were recycled to the esterification system at a rate of 480 grams per hour.

The bottoms material from the extractive distillation column, consisting of about 7.6% by weight of trimethyl borate, about 0.15% by weight methanol and 92.25% by weight nonane, was fed to a forefraction column at a rate of 14,746 grams per hour and distilled under reflux, 4 to 1 ratio, at atmospheric pressure. The overhead material, containing about 16% by weight methanol and about 84% by weight trimethyl borate was recycled to the extractive distillation column at a rate of 146 grams per hour. Nonane and trimethyl borate, approximately 6.8% by weight of trimethyl borate, were removed from the bottom of the forefraction column and sent to a refining column at a rate of about 14,600 grams per hour. 1,000 grams per hour of refined trimethyl borate was separated by distillation. The nonane fraction, in an amount of about 13,600 grams per hour, was recycled to the extractive distillation system.

It is to be understood that the invention, as above described, is based on the discovery that mixtures or binary azeotropes of alkyl borates with lower aliphatic alcohols can be resolved through extractive distillation with a water immiscible solvent. The particular manner for effecting esterification and for separating the solvent-alkyl borate mixture as obtained in the extractive distillation are conventional procedures known in the art. It is to be noted that it is also permissable for the alkyl borate-solvent mixture, obtained as bottoms in the extractive distillation, to contain minor amounts of alcohol. The presence of alcohol merely indicates that the conditions of the distillation are slightly less than ideal, and can be corrected, if desired, by several means, e.g., by employing somewhat higher ratios of nonane to feed mixture, a distillation column having a greater number of theoretical plates, or by improving the heat balance in the system, etc.

What is claimed is:

1. In a method for producing borate triesters of lower aliphatic alcohols selected from the group consisting of methanol, ethanol and mixtures thereof wherein a mixture is obtained of said ester and alcohol, the improvement of vaporizing said mixture in a distillation column, contacting the vaporized mixture with a downwardly flowing, water-immiscible solvent, wherein said solvent is a mixture of liquid aliphatic hydrocarbons having 7 to 10 carbon atoms, removing a mixture of borate triester and said solvent from the bottom of the column, and thereafter recovering said ester.

2. In a method for producing borate triesters of lower aliphatic alcohols selected from the group consisting of methanol, ethanol and mixtures thereof wherein a mixture is obtained of said ester and alcohol, the improvement of vaporizing said mixture in a distillation column, contacting the vaporized mixture with a downwardly flowing, water-immiscible liquid solvent consisting of a mixture of isomeric nonanes, removing a mixture of borate triester and said solvent from the bottom of the column and thereafter recovering said ester.

3. In a method for producing trimethyl borate by reacting methanol with a member selected from the group of boric acid and boron oxide in which a mixture of trimethyl borate and methanol is obtained, the improvement of vaporizing said mixture in a distillation column, contacting the vaporized mixture with a downwardly flowing, water-immiscible solvent, wherein said solvent is a mixture of liquid aliphatic hydrocarbons having 7 to 10 carbon atoms, removing a mixture of trimethyl borate and said solvent from the bottom of the column, and thereafter recovering trimethyl borate.

4. In a method for producing trimethyl borate by reacting methanol with a member selected from the group of boric acid and boron oxide in which a mixture of trimethyl borate and methanol is obtained, the improvement of vaporizing said mixture in a distillation column, contacting the vaporized mixture with a downwardly flowing, water-immiscible solvent consisting of a mixture of isomeric nonanes, removing a mixture of trimethyl borate and said solvent from the bottom of the column, and thereafter recovering trimethyl borate.

5. In a method for producing trimethyl borate by reacting methanol with a member selected from the group of boric acid and boron oxide in which a mixture of trimethyl borate and methanol is obtained, the improvement of vaporizing said mixture in a distillation column, contacting the vaporized mixture with a downwardly flowing solvent, where said solvent is xylene, removing a mixture of trimethyl borate and said solvent from the bottom of the column, and thereafter recovering trimethyl borate.

References Cited in the file of this patent

UNITED STATES PATENTS

| | | |
|---|---|---|
| 2,642,453 | Lippincott | June 16, 1953 |
| 2,802,018 | Ton | Aug. 6, 1957 |
| 2,880,144 | Bush | Mar. 31, 1959 |
| 2,944,076 | Rice | July 5, 1960 |

OTHER REFERENCES

Perry: Chemical Engineers Handbook, 3d ed., McGraw-Hill Book Co., Inc., New York, 1950, pp. 634 and 643–5.